United States Patent
Miyata

(10) Patent No.: US 12,554,264 B2
(45) Date of Patent: Feb. 17, 2026

(54) INFORMATION PROCESSING METHOD, INFORMATION PROCESSING APPARATUS, AND INFORMATION PROCESSING SYSTEM FOR ACQUIRING AN ACCELERATION IN A CENTER DIRECTION

(71) Applicant: Sony Group Corporation, Tokyo (JP)

(72) Inventor: Kouji Miyata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 209 days.

(21) Appl. No.: 18/249,974

(22) PCT Filed: Oct. 8, 2021

(86) PCT No.: PCT/JP2021/037295
§ 371 (c)(1),
(2) Date: Apr. 21, 2023

(87) PCT Pub. No.: WO2022/102303
PCT Pub. Date: May 19, 2022

(65) Prior Publication Data
US 2023/0393589 A1 Dec. 7, 2023

(30) Foreign Application Priority Data
Nov. 11, 2020 (JP) .............................. 2020-188227

(51) Int. Cl.
G05D 1/10 (2006.01)
G05D 1/00 (2006.01)
B64U 101/30 (2023.01)

(52) U.S. Cl.
CPC ........... G05D 1/101 (2013.01); G05D 1/0038 (2013.01); G05D 1/0808 (2013.01); B64U 2101/30 (2023.01)

(58) Field of Classification Search
CPC .... G05D 1/101; G05D 1/0038; G05D 1/0808; B64U 2101/30
See application file for complete search history.

(56) References Cited

U.S. PATENT DOCUMENTS 11,940,816 B2 * 3/2024 English ............... B64C 13/0421
2012/0232718 A1 * 9/2012 Rischmuller .......... A63H 30/04
701/2

(Continued)

FOREIGN PATENT DOCUMENTS

CN 105864232 A * 8/2016
CN 111279285 A 6/2020

(Continued)

OTHER PUBLICATIONS

English translation of WO-2021140555-A1 (Year: 2021).*

(Continued)

*Primary Examiner* — Todd Melton
*Assistant Examiner* — Matthew Ho
(74) *Attorney, Agent, or Firm* — XSENSUS LLP

(57) ABSTRACT

To provide an information processing method, an information processing apparatus, and an information processing system that enable a flight vehicle to easily perform circular turning.
The information processing method of the present disclosure causes a computer to generate, on the basis of first information instructing a velocity of a moving body and second information instructing an angular velocity of the moving body, and with a direction of the velocity as a tangential direction, an acceleration in a center direction of a circle having a radius corresponding to the velocity and the angular velocity.

18 Claims, 7 Drawing Sheets

(56) References Cited

U.S. PATENT DOCUMENTS

| | | | | |
|---|---|---|---|---|
| 2016/0231753 A1* | 8/2016 | Wise | ............... | G01C 21/10 |
| 2017/0160751 A1* | 6/2017 | Pierce | ............... | B64U 10/13 |
| 2017/0184414 A1* | 6/2017 | Johnson | ............... | G01C 21/18 |
| 2018/0362158 A1* | 12/2018 | Zhang | ............... | G05D 1/683 |
| 2020/0324901 A1* | 10/2020 | Geng | ............... | G05D 1/0011 |
| 2022/0215632 A1* | 7/2022 | Liang | ............... | G06T 7/60 |

FOREIGN PATENT DOCUMENTS

| | | | | |
|---|---|---|---|---|
| EP | 2940547 B1 * | 3/2019 | ............ | B64C 13/16 |
| JP | S62-221996 A | 9/1987 | | |
| JP | 2009-515771 A | 4/2009 | | |
| JP | 2012-198883 A | 10/2012 | | |
| JP | 2019-507924 A | 3/2019 | | |
| JP | 2019-511044 A | 4/2019 | | |
| WO | WO-2019157400 A1 * | 8/2019 | ............ | B63B 43/00 |
| WO | 2020/031812 A1 | 2/2020 | | |
| WO | WO-2021140555 A1 * | 7/2021 | | |

OTHER PUBLICATIONS

English translation of CN-105864232-A (Year: 2016).*
English translation of EP-2940547-B1 (Year: 2019).*
International Search Report and Written Opinion mailed on Nov. 22, 2021, received for PCT Application PCT/JP2021/037295, filed on Oct. 8, 2021, 9 pages including English Translation.

* cited by examiner

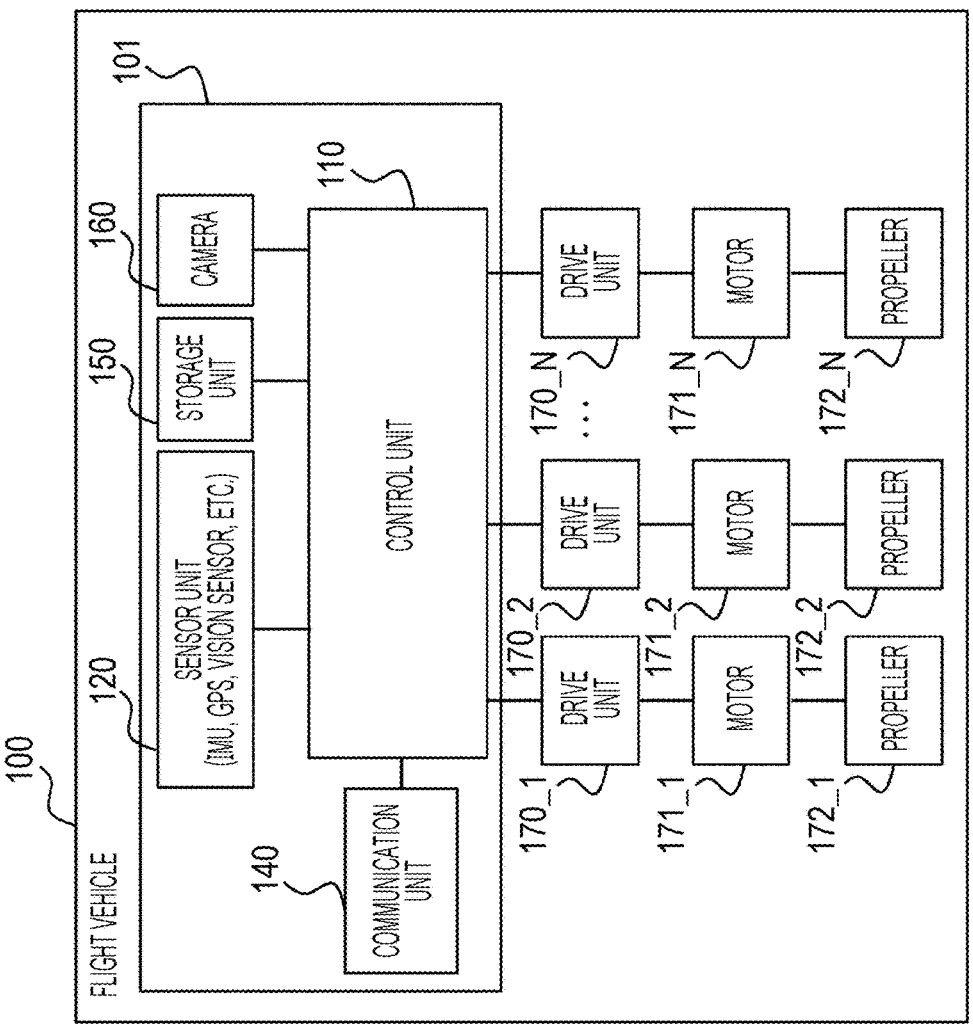
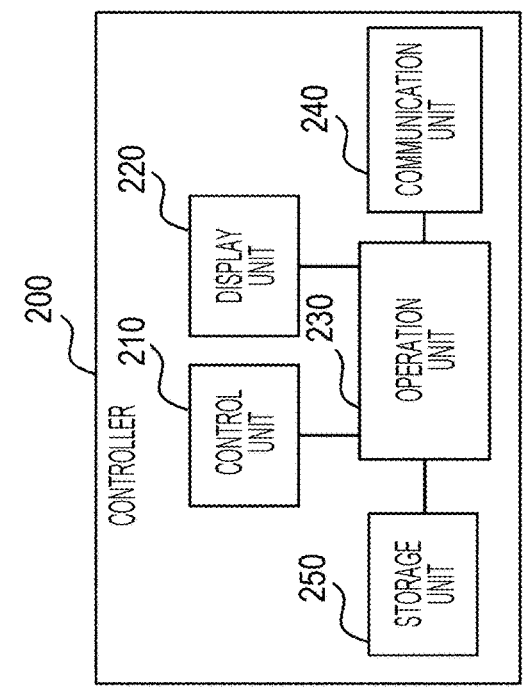
FIG. 1

INFORMATION PROCESSING METHOD, INFORMATION PROCESSING APPARATUS, AND INFORMATION PROCESSING SYSTEM FOR ACQUIRING AN ACCELERATION IN A CENTER DIRECTION

CROSS-REFERENCE TO RELATED APPLICATIONS

The present application is based on PCT filing PCT/JP2021/037295, filed Oct. 8, 2021, which claims priority to Japanese Application No. 2020-188227, filed Nov. 11, 2020, the entire contents of each are incorporated herein by reference.

TECHNICAL FIELD

The present disclosure relates to an information processing method, an information processing apparatus, and an information processing system.

BACKGROUND ART

As an imaging method adopted by a flight vehicle such as a multicopter used for aerial imaging and the like, there is an imaging method of circularly turning (circular turning flight) around a subject like a satellite orbit. This imaging method requires a high skill of an operator and has a high degree of difficulty. Therefore, a demand for automation of circular turning flight has been strong.

As a technique for realizing the circular turning flight, there has been a technique for flying a flight vehicle along a designated orbit by designating a center point and a radius or designating a velocity and a radius. However, a standard flight vehicle maneuver method is a method that designates a velocity and an angular velocity, and it has been difficult to designate a center point. In addition, also in a case of designating a radius, a difference in maneuverability from the case of designating an angular velocity becomes a large problem in some cases. For example, it is assumed that the flight vehicle does not rotate (a radius is infinite) in a case where input of the radius is 0 (when a stick is in a neutral state), and the radius of rotation decreases as the amount (operation amount) by which the stick is inclined increases. In a case where the operator desires to turn the multicopter in a small circular orbit, the operator instinctively desires to reduce the operation amount of the stick. However, in practice, when the operation amount of the stick is small, the radius increases, and thus, when the flight vehicle starts to turn, the flight vehicle turns in a huge circular orbit. In particular, the operator often intends a small orbit in a case where the velocity of the flight vehicle is low, and in this case, the sense of discomfort becomes particularly large, which is dangerous.

CITATION LIST

Patent Document

Patent Document 1: Japanese Patent Application Laid-Open No. S62-221996
Patent Document 2: Japanese Translation of PCT Application No. 2009-515771

SUMMARY OF THE INVENTION

Problems to be Solved by the Invention

The present disclosure provides an information processing method, an information processing apparatus, and an information processing system that enable a flight vehicle to easily perform circular turning.

Solutions to Problems

The information processing method of the present disclosure includes causing a computer to generate, on the basis of first information giving an instruction on a velocity of a moving body and second information giving an instruction on an angular velocity of the moving body, and with a direction of the velocity as a tangential direction, an acceleration in a center direction of a circle having a radius corresponding to the velocity and the angular velocity.

The information processing apparatus of the present disclosure includes a control unit that generates, on the basis of first information giving an instruction on a velocity of a moving body and second information giving an instruction on an angular velocity of the moving body, and with a direction of the velocity as a tangential direction, an acceleration in a center direction of a circle having a radius corresponding to the velocity and the angular velocity.

The information processing system of the present disclosure includes:
a moving body; and
an operation terminal including an acquisition unit that acquires first information giving an instruction on a velocity of the moving body and second information giving an instruction on an angular velocity of the moving body, and a transmission unit that transmits the first information and the second information,
in which the moving body includes:
a reception unit that receives the first information and the second information; and
a control unit that generates, on the basis of the first information and the second information and with a direction of the velocity as a tangential direction, an acceleration in a center direction of a circle having a radius corresponding to the velocity and the angular velocity, and controls movement of the moving body on the basis of the acceleration.

BRIEF DESCRIPTION OF DRAWINGS

FIG. 1 is a block diagram of a communication system according to an embodiment of the present disclosure.

MODE FOR CARRYING OUT THE INVENTION

Figure 2:
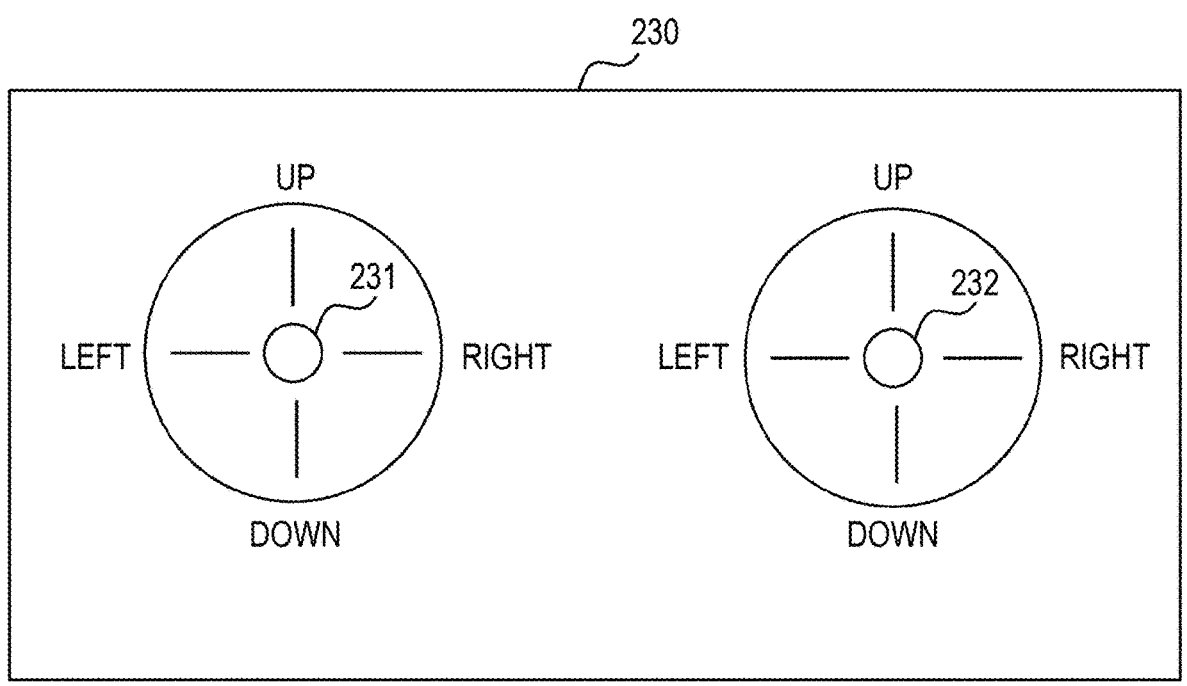
FIG. 2 is an external plan view showing a configuration example of an operation unit in a controller.

Hereinafter, an embodiment of the present disclosure is described in detail with reference to the drawings. In one or more embodiments shown in the present disclosure, elements included in each of the embodiments can be combined with each other, and the combined result also forms a part of the embodiments shown in the present disclosure.

FIG. 1 is a block diagram of a communication system according to an embodiment of the present disclosure. The communication system in FIG. 1 includes a flight vehicle (flight device) 100 and a controller 200. The flight vehicle 100 is, for example, a multicopter including a plurality of propellers. The flight vehicle 100 may be a drone (unmanned aerial vehicle) or a manned aerial vehicle. The flight vehicle 100 is an example of a moving body according to the present embodiment, and the moving body according to the present embodiment may be a moving body other than the flight vehicle as long as the moving body can be remotely operated, such as a robot automated vehicle or an autonomous vehicle. The flight vehicle 100 and the controller 200 can bidirectionally communicate with each other. The controller 200 is a remote controller (also referred to as a proportional controller) operated by a user.

The flight vehicle 100 can fly by driving a plurality of propellers (rotors) by motors. The flight vehicle 100 wirelessly communicates with the controller 200 operated by the user, and flies along a route designated by the controller 200 under the control of the controller 200.

The flight vehicle 100 includes an information processing apparatus 101, N drive units 170_1 to 170_N, N motors 171_1 to 171_N, and N propellers (rotors) 172_1 to 172_N. The information processing apparatus 101 includes a control unit 110, a sensor unit 120, a communication unit 140, a storage unit 150, and a camera 160. In the example of the drawing, N sets of the drive unit, the motor, and the propeller are provided. The value of N may be any integer of 1 or more. As an example, the value of N is 4.

In a case where the drive units 170_1 to 170_N are not distinguished from each other, the drive units 170_1 to 170_N are collectively referred to as the drive units 170. In a case where the motors 171_1 to 171_N are not distinguished from each other, the motors 171_1 to 171_N are collectively referred to as the motors 171. In a case where the propellers 172_1 to 172_N are not distinguished from each other, the propellers 172_1 to 172_N are collectively referred to as the propellers 172.

The camera 160 senses a detection range (imaging range) in a space where the flight vehicle 100 flies, and acquires image data including a luminance value (also referred to as a gradation value). The camera 160 stores the acquired image data in the storage unit 150 in association with time. The camera 160 may provide the acquired image data to the control unit 110. The image data is a still image or a moving image. The camera 160 is, for example, an RGB camera, an infrared camera, or the like. An imaging element is, for example, a charge coupled device (CCD) image sensor, a complementary metal oxide semiconductor (CMOS) image sensor, or the like. The number of the cameras 160 may be one or more. The position and the attitude of the camera 160 may be fixed, or the position and the attitude of the camera 160 may be variable by the control unit 110. A depth camera may be used as the camera 160. The depth camera acquires image data including a depth value (distance value) by sensing.

The propellers 172_1 to 172_N cause flight vehicle 100 to fly by generating lift by rotation. The propellers 172_1 to 172_N is rotated by the motors 171_1 to 171_N. The motors 171_1 to 171_N rotate motor shafts to rotate the propellers 172_1 to 172_N. The motors 171_1 to 171_N are driven by the drive units 170_1 to 170_N. The drive units 170_1 to 170_N drive the motors 171_1 to 171_N to rotate the propellers 172_1 to 172_N at the rotational speed designated by the control unit 110. The drive unit is, for example, an electric speed controller (ESC).

The control unit 110 controls operation of the flight vehicle 100. The control unit 110 controls the sensor unit 120, the communication unit 140, the storage unit 150, the camera 160, and the drive unit 170.

The control unit 110 adjusts the rotational speed of the propeller 172 by controlling the rotational speed of the motor 171 via the drive unit 170. The control unit 110 can adjust the attitude of the flight vehicle 100 by adjusting the rotational speed of the propeller 172, and can move the flight vehicle 100 in an optional direction and at an optional velocity.

The control unit 110 controls the camera 160 during the flight. For example, the control unit 110 controls the camera 160 to capture an image at every regular sampling intervals. Furthermore, the control unit 110 controls transmission and reception of information or data to and from the controller (remote controller) 200 of the user via the communication unit 140.

The control unit 110 controls the flight on the basis of instruction data provided from the controller 200. The control unit 110 controls the flight vehicle 100 to fly along the route designated by the instruction data.

The communication unit 140 transmits and receives information or data by performing wireless communication with the communication unit 240 of the controller 200 held by the user. Any method may be used for a method of the wireless communication. For example, the standard may be the IEEE 802.11 standard, the IEEE 802.15.1 standard, or other standards. The frequency band used for wireless communication is, for example, a 2.4 GHz band, a 5 GHz band, or other frequency bands.

As an example, the communication unit 140 receives instruction data related to flight from the controller 200. The communication unit 140 provides the instruction data to the control unit 110. The control unit 110 performs control to fly according to the instruction data.

The sensor unit 120 includes one or a plurality of sensors that acquires the state of the flight vehicle 100. Examples of the sensor include a global positioning system (GPS), a vision sensor, an inertial measurement unit (IMU), an acceleration sensor, an orientation sensor (such as a gyro sensor, a GPS compass, and an electronic compass), a three-axis magnetic sensor, an ultrasonic sensor, and an atmospheric pressure sensor.

The control unit 110 detects the position and the velocity of the flight vehicle 100 using the sensor unit 120. The control unit 110 includes a position detection unit that detects a position of the flight vehicle 100 and a velocity detection unit that detects a velocity of the flight vehicle 100. The control unit 110 detects the position and the velocity using the GPS as an example. The control unit 110 may store the information of the detected position and velocity in the storage unit 150 in association with time.

The position of the flight vehicle 100 may be a position based on the latitude and the longitude acquired by the GPS or the like. The position based on the latitude and the longitude acquired by the GPS or the like may be converted into a position in a predetermined coordinate system. The predetermined coordinate system is, for example, a three-axis coordinate system (XYZ coordinate system) with the position of the controller 200 or the like set as the origin or set to a predetermined position, such as (X, Y, Z)=(7.3 m, 4.1 m, 15.8 m).

The method of detecting the position and the velocity of the flight vehicle 100 is not limited to the method using the GPS, and for example, a vision sensor may be used. In this case, for example, the flight vehicle 100 is made to fly on the ground surface having a predetermined pattern. The vision sensor images the ground surface using the imaging device, compares the captured image with the predetermined pattern, and detects the position and the velocity of the flight vehicle 100. The control unit 110 acquires the position and the velocity detected by the vision sensor.

In addition, the control unit 110 detects the attitude of the flight vehicle 100 using the sensor unit 120. An inertial measurement unit (IMU) can be used as an example for detecting the attitude. The IMU includes a gyro sensor and an acceleration sensor as an example. The gyro sensor detects angular velocities of the three axes with respect to the reference axis. The acceleration sensor detects accelerations of the three axes with respect to the reference axis. The attitude is detected by cumulatively adding the detected angular velocities and accelerations. The control unit 110 may store the information representing the detected attitude of the flight vehicle 100 in the storage unit 150 in association with time. The control unit 110 may store the information of the detected acceleration and angular velocity in the storage unit 150 in association with time.

The control unit 110 is configured by software, hardware, or both. As an example, the control unit 110 may be configured by a computer including a processor such as a central processing unit (CPU). The function of the control unit 110 may be realized by causing the processor to execute a program.

Note that the flight vehicle 100 includes a battery (not illustrated) that stores electric power energy for operating each element in the flight vehicle 100. The battery may be a primary battery that can only be discharged or a secondary battery that can be charged and discharged.

The storage unit 150 stores the attitude (acceleration and angular velocity) acquired by the control unit 110, the position and the velocity acquired by the control unit 110, the image data acquired by the camera 160, and the like.

The storage unit 150 may store information associated with attributes and performance of the flight vehicle 100. For example, there are information such as an aircraft ID (which may be an address for communication), positions and the number of the cameras 160, an imaging range (for example, an angle of view) of the camera 160, parameter information of the camera 160, braking performance, or turning performance.

The storage unit 150 may store a program to be executed by the processor. The storage unit 150 includes, for example, an optional recording medium such as a memory, a hard disk, or an optical disk. The memory may be a volatile memory such as a read only memory (RAM) or a nonvolatile memory such as a flash memory.

The controller 200 in FIG. 1 includes a control unit 210, a display unit 220, an operation unit 230, a communication unit 240, and a storage unit 250. The controller 200 functions as a device that can remotely operate the flight vehicle 100. The user can control take-off, flight, and landing of the flight vehicle 100 by using the controller 200.

The communication unit 240 transmits and receives information or data by performing wireless communication with the communication unit 140 of the flight vehicle 100. Any method may be used for a method of the wireless communication. For example, the standard may be the IEEE 802.11 standard, the IEEE 802.15.1 standard, or other standards. The frequency band used for wireless communication is, for example, a 2.4 GHz band, a 5 GHz band, or other frequency bands.

The control unit 210 controls operation of the controller 200. The control unit 210 generates instruction data related to the flight of the flight vehicle 100. The control unit 210 generates instruction data regarding the flight of the flight vehicle 100 on the basis of a user operation on the operation unit 230. Furthermore, the control unit 210 may generate instruction data for controlling image capturing by the camera 160 provided in the flight vehicle 100. The control unit 210 transmits the instruction data generated by the control unit 210 via the communication unit 240. The communication unit 240 acquires the instruction data from the control unit 210, and transmits the instruction data to the flight vehicle 100.

The control unit 210 controls transmission and reception of information or data to and from the flight vehicle 100. As an example, the control unit 210 may acquire, from the flight vehicle 100, information or data detected by at least one of the camera 160, the sensor unit 120, or the control unit 110 of the flight vehicle 100.

The control unit 210 is configured by software, hardware, or both. As an example, the control unit 210 may be configured by using a computer including a processor such as a central processing unit (CPU). The function of the control unit 210 may be realized by causing the processor to execute a program.

The storage unit 250 stores information, data, and the like received from the flight vehicle 100. In addition, the storage unit 250 may store a program to be executed by the processor. The storage unit 250 includes, for example, an optional recording medium such as a memory, a hard disk, or an optical disk. The memory may be a volatile memory or a nonvolatile memory.

The display unit 220 is, for example, a display device such as a liquid crystal display device or an organic electroluminescence (EL) display device. The display unit 220 displays, for example, image data captured by the camera 160 and information indicating an operation state of the flight vehicle 100. The display unit 220 may include a touch panel. The function of the operation unit 230 may be realized by the touch panel. In this case, the user controls the flight of the flight vehicle with the touch panel.

The controller 200 includes a battery (not illustrated) that stores electric power for operating the controller 200. The battery may be a primary battery that can only be discharged or a secondary battery that can be charged and discharged.

In the example in FIG. 1, the display unit 220 is formed integrally with the controller 200, but the display unit 220 may be detachable from the controller 200, and the display unit 220 may be externally attached to the controller. The control unit 210 is also formed integrally with the controller 200, but the control unit 210 may be detachable from the controller 200, and the control unit 210 may be externally attached to the controller. In this case, the control unit 210 may include an information processing terminal (information processing apparatus) such as a smartphone, a personal computer (PC), or a tablet terminal. The information processing terminal may be connected to the operation unit 230 in a wired or wireless manner. In addition, in a case where the display unit of the information processing terminal includes a touch panel, the function of the operation unit 230 may be realized by the touch panel. The information processing terminal may be installed in a cloud such as the Internet.

FIG. 2 is an external plan view showing a configuration example of the operation unit 230 in the controller 200. The operation unit 230 includes a left stick 231 and a right stick 232. In addition, the operation unit 230 may include components such as a power on/off button and buttons for various settings. When the left stick 231 is inclined upward or downward, the flight vehicle 100 ascends or descends, and the ascending velocity or the descending velocity increases as the inclination amount (operation amount) increases. When the left stick 231 is inclined rightward or leftward, a clockwise rotational angular velocity or a counterclockwise rotational angular velocity is applied with reference to a virtual axis penetrating the flight vehicle 100 in the up-and-down direction. As an example, the up-and-down direction corresponds to the Z-axis direction in a case where the flight vehicle 100 moves in a space constituted by XYZ axes. The larger the inclination amount (operation amount), the larger the absolute value of the applied rotational angular velocity. The left stick 231 may be inclinable in any direction by 360° in addition to four directions which are up, down, left, and right directions. As a result, the ascending or descending velocity and the clockwise or counterclockwise rotational angular velocity can be simultaneously designated.

When the right stick 232 is inclined upward or downward, the flight vehicle 100 moves forward or backward along the XY plane. The larger the inclination amount (operation amount), the larger the forward or backward moving velocity. When the right stick 232 is inclined leftward or rightward, the flight vehicle 100 moves leftward or rightward along the XY plane. The larger the inclination amount (operation amount), the larger the leftward or rightward moving velocity. The right stick 232 may be inclinable in any direction by 360° in addition to four directions which are up, down, left, and right directions. In this case, an instruction on the velocity can be given by a two-dimensional vector that is a combination of upward, downward, leftward, and rightward components of the right stick 232.

In the present exemplary embodiment, the user inputs an instruction of the velocity and an instruction of the angular velocity from the operation unit 230 as a start instruction of circular turning, and the control unit 110 of the flight vehicle 100 turns the flight vehicle 100 in a circular orbit according to the velocity and angular velocity on which the instructions are given. As a result, the user does not need to designate the radius, the center point, and the like of the circle, and can turn the flight vehicle 100 in a desired orbit using a normal remote controller (proportional controller) for operating the flight vehicle 100.

Figure 3:
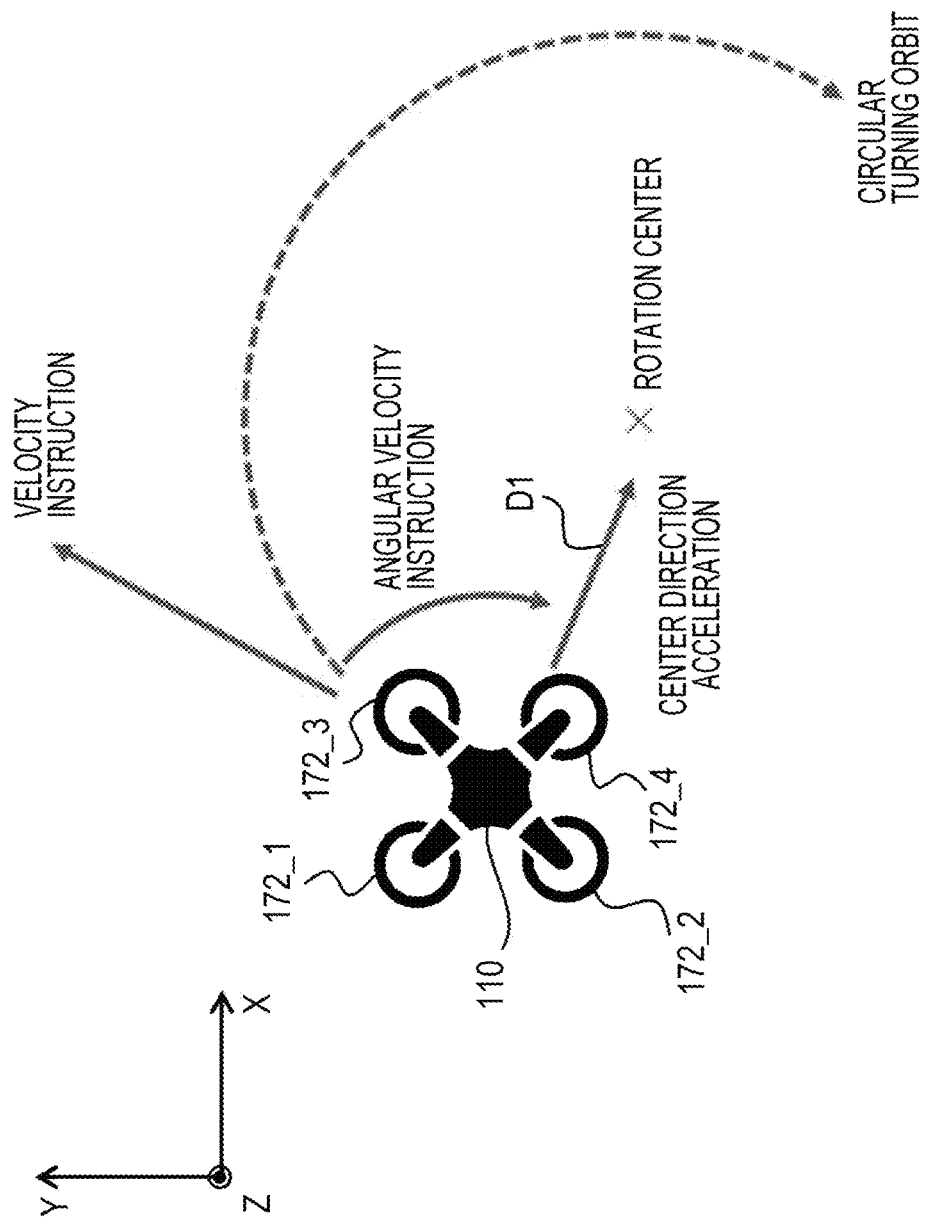
FIG. 3 is a diagram showing an example in which a flight vehicle is circularly turned on an orbit corresponding to a velocity and an angular velocity on which an instruction is given by a user.

FIG. 3 is a diagram showing an example in which the flight vehicle 100 is circularly turned on an orbit corresponding to the velocity and the angular velocity on which the instruction is given by the user. The user operates the operation unit 230 to simultaneously input a velocity instruction and an acceleration instruction. A set of instructions including the velocity instruction and the acceleration instruction that are simultaneously input functions as a circular turning instruction. While giving an instruction on the circular turning, the user holds the left stick 231 and the right stick 232 at the positions of the input velocity and acceleration. The control unit 110 receives instruction data of the velocity and instruction data of the angular velocity from the controller 200 as start instruction data of the circular turning.

The control unit 110 interprets the velocity on which the instruction is given as a velocity in the tangential direction of the circular orbit. In addition, the control unit 110 interprets the direction (rightward or leftward) indicated by the angular velocity on which the instruction is given as a direction of circular turning, and interprets a value of the angular velocity as a velocity of circular turning (velocity of moving along the circular orbit).

The control unit 110 sets a direction rotated by 90° in the rotation direction from the tangential direction as a rotation center direction D1. The control unit 110 acquires the acceleration (center direction acceleration) necessary for moving the flight vehicle 100 in the rotation center direction D1. That is, the control unit 110 sets the direction of the velocity as the tangential direction, and acquires the acceleration in the center direction of the circle having the radius corresponding to the velocity and the angular velocity.

The acceleration is proportional to the product of the tangential velocity and the rotational speed, and is expressed as $a=v*\omega$. a is the acceleration, r is the velocity, and $\omega$ is the angular velocity. The control unit 110 acquires the angular velocity on the basis of the product of the velocity on which the instruction is given and the angular velocity on which the instruction is given. The acceleration a necessary for the uniform circular motion is expressed by $a=r*\omega^2$, where the radius of the circular orbit is r and the angular velocity is $\omega$. Assuming that the velocity in the tangential direction of the circular orbit is v, $\omega=v/r$, and thus $r=v/w$. Therefore, $a=v*\omega$ is established. That is, the radius r is not required, and the acceleration necessary for the circular turning can be obtained only from the velocity and the angular velocity.

A lookup table in which the velocity and the angular velocity are associated with the acceleration (center direction acceleration) may be stored in the storage unit 150, and the control unit 110 may obtain the acceleration on the basis of the lookup table. Alternatively, a function having the velocity and the angular velocity as input variables and the acceleration as an output variable may be stored in the storage unit 150, and the control unit 110 may calculate the acceleration on the basis of the function.

On the basis of the acquired acceleration, the control unit 110 controls a propulsive force (propeller thrust) for moving the flight vehicle 100 along the circular orbit.

Figure 4:
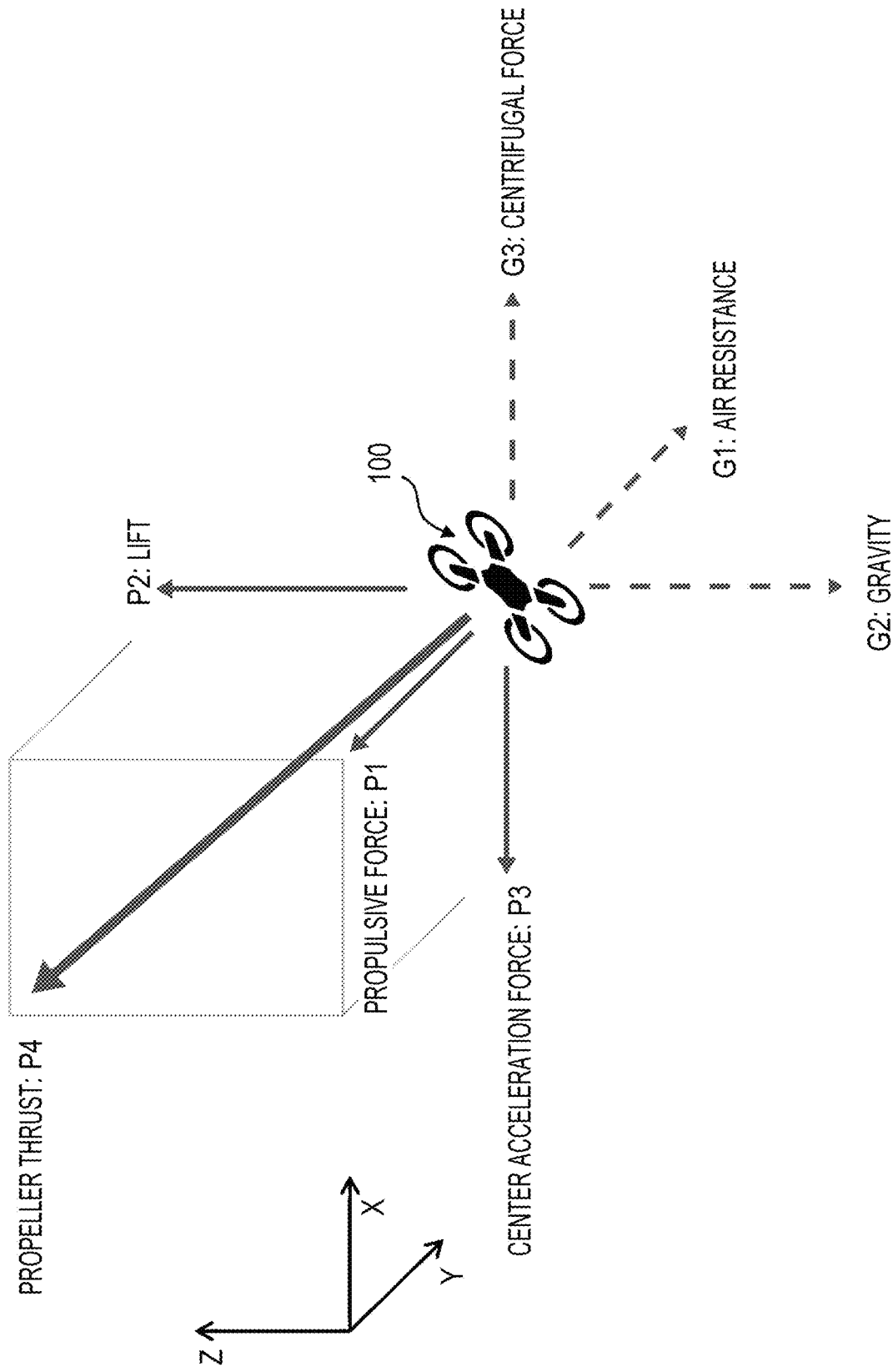
FIG. 4 is a diagram showing an example of generating a propulsive force (propeller thrust) for moving the flight vehicle along a circular orbit.

FIG. 4 is a diagram showing an example of generating the propulsive force (propeller thrust) for moving the flight vehicle 100 along the circular orbit. The propulsive force of the flight vehicle for flying in the traveling direction with respect to air resistance G1 is P1, lift of the flight vehicle for stopping in the air with respect to gravity G2 is P2, and center acceleration force of the flight vehicle for generating the center acceleration necessary for rotation with respect to centrifugal force G3 is P3. The control unit 110 obtains the attitude of the flight vehicle 100 so as to apply propeller thrust P4 obtained by combining P1 to P3 to the direction obtained by combining P1 to P3, and controls the rotational speed of the propellers 172_1 to 172_4. That is, by obtaining the attitude of the flight vehicle 100 necessary for obtaining the propeller thrust P4 and the rotational speed of the propellers 172_1 to 172_4, and rotating the motor shaft at the rotational speed, the flight vehicle 100 is moved by the propeller thrust P4. As a result, the flight vehicle 100 can be moved along the circular orbit.

A case is considered where the flight vehicle 100 is, for example, circularly turned rightward parallel to the XY plane (in the horizontal direction) using the operation unit 230 in the example in FIG. 2. At this time, the left stick 231 is inclined rightward by a desired operation amount to designate the angular velocity, and the right stick 232 is inclined in a desired direction by a desired operation amount to designate the velocity. In a case where the flight vehicle 100 is circularly turned in an optional direction in the XYZ space, a velocity component in the Z-axis direction is designated by upward and downward movements of the left stick 231, and a velocity component in the XY-axis direction is designated by upward, downward, leftward, and rightward movements of the right stick 232. The velocity can be designated by a combined vector of velocity components in X, Y, and Z directions.

The user can change the size of a circle of the circular turning by operating the operation unit 230 during the circular turning. For example, from the relationship of r=v/w, when the velocity v is increased, the circle becomes larger, and when the angular velocity w is increased, the circle becomes smaller. The user can change the size of the circle while checking the state of the flight vehicle 100. Furthermore, by adjusting the velocity v and the angular velocity w, the velocity can be increased with the same size of the circle.

In a case where the user stops the instruction to perform the circular turning, for example, at least one of the velocity or the acceleration only required to be set to zero by the operation unit 230. That is, at least one of the left stick 231 or the right stick 232 only required to be made neutral. However, a button for giving an instruction to stop the circular turning may be provided in the operation unit 230, and an instruction on the end of the circular turning may be given by pressing the button. Alternatively, the instruction on the end of the circular turning may be given by inclining each of the left stick 231 and the right stick 232 to a predetermined specific position. The instruction on the end of the circular turning may be given by other methods.

The control unit 110 may generate a circle having a radius r (=v/w) and a center point of the circle on the basis of the velocity v and the angular velocity w on which an instruction is given from the controller 200, and may generate data of the circle centered on the center point as the turning orbit of the flight vehicle 100. Furthermore, the control unit 110 may generate information indicating the turning direction (right or left rotation direction). The control unit 110 may transmit the circle data and the turning direction information to the controller 200, and display the circle data and the turning direction information on the display unit 220 of the controller 200. In a case where the control unit 210 is an information processing terminal, the circle data or the like may be displayed on a display unit of the information processing terminal.

Figure 5:
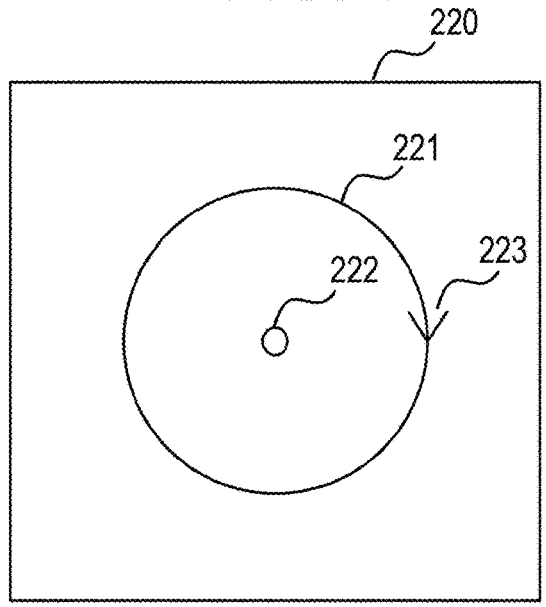
FIG. 5 is a diagram showing a circular turning orbit displayed on a display unit of a controller.

FIG. 5 is a diagram showing an example of a circular turning orbit 221 displayed on the display unit 220 of the controller 200. A center point 222 of the circle and information 223 indicating the turning direction are shown. The orbit 221 and the center point 222 may be displayed to be superimposed on an image captured by the camera 160. In the example in FIG. 5, the entire orbit 221 is displayed, but a part of the orbit 221 may be displayed. By viewing the display unit 220, the user can specifically check the geographical position where the flight vehicle 100 is circularly turning.

Figure 6:
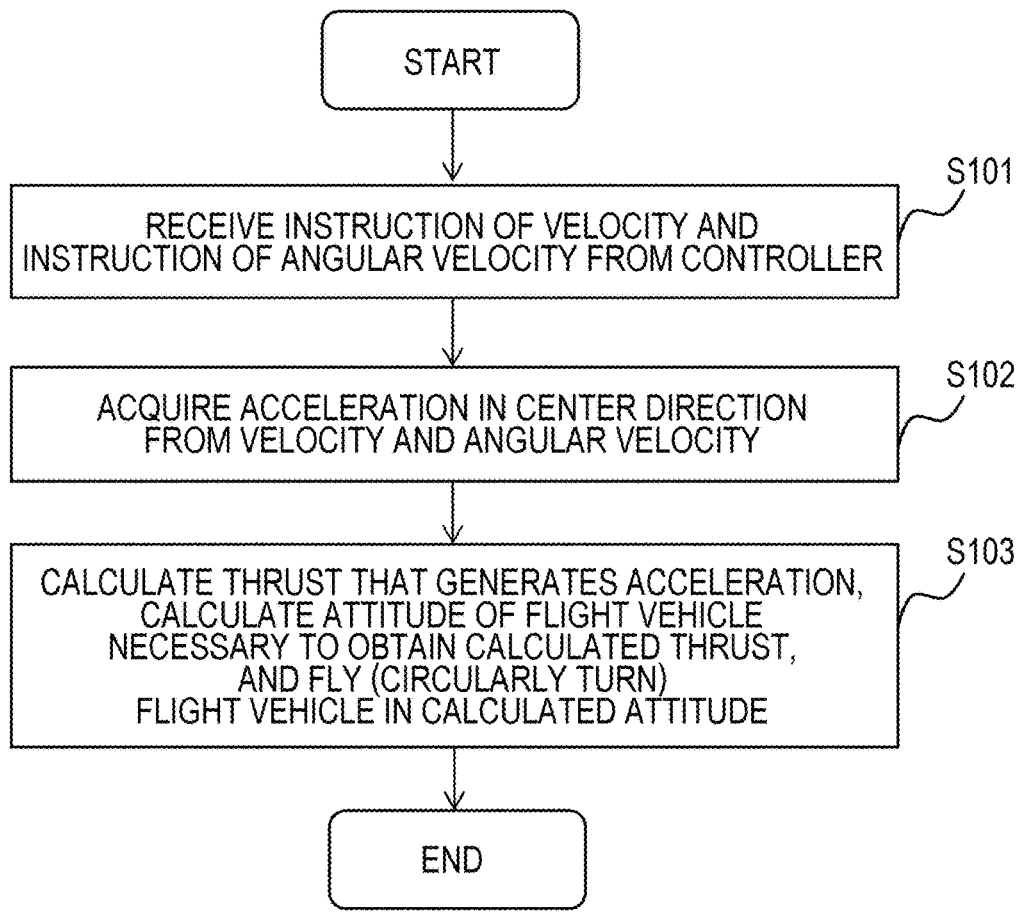
FIG. 6 is a flowchart showing an example of operation of a control unit of the flight vehicle according to the present embodiment.

FIG. 6 is a flowchart showing an example of operation of the control unit 110 of the flight vehicle 100 according to the present embodiment. The control unit 110 receives start instruction data for circular turning including instruction of the velocity v and instruction of the angular velocity w from the controller 200 (S101). The control unit 110 acquires the acceleration a in the center direction on the basis of the velocity v and angular velocity w on which the instruction is given (S102). The product of the velocity v and the angular velocity w may be calculated, or the angular velocity a may be acquired from the velocity v and the angular velocity w with reference to the lookup table. The control unit 110 calculates the thrust (propeller thrust) P4 necessary for causing the flight vehicle 100 to generate the acquired acceleration a, and calculates the attitude of the flight vehicle 100 necessary for obtaining the calculated thrust P4 (S103). Then, the control unit 110 calculates the rotational speed of the propeller that moves the flight vehicle 100 in the calculated attitude, and drives the motor at the calculated rotational speed to fly the flight vehicle 100 with the calculated thrust described above. As a result, the flight vehicle 100 can circularly turn around along the orbit of the circle having the radius r (=v/w).

As described above, according to the present embodiment, the user can instruct the flight vehicle 100 to circularly turn by designating the angular velocity and the velocity without designating the radius and the center point of the circle. That is, the flight vehicle can be easily instructed to perform the circular turning by using input means of the angular velocity and the velocity provided in a general operation device (proportional controller) of a flight vehicle such as a drone. Furthermore, by changing the designated angular velocity and velocity, the size of the circular turning during flight can be changed.

MODIFIED EXAMPLE 1

The control unit 110 may be configured to be switchable between a first mode in which the circular turning processing is valid and a second mode in which the circular turning processing is invalid. The control unit 210 of the controller 200 determines information for designating the first mode or the second mode on the basis of the user operation, and transmits the determined information to the flight vehicle 100. The control unit 110 of the flight vehicle 100 sets the first mode or the second mode on the basis of the received information. When the flight vehicle 100 is in the first mode, in a case where instruction of the velocity and instruction of the angular velocity are received from the controller 200, the control unit 110 interprets the instruction of the velocity and the instruction of the angular velocity thus received as the start instruction of the circular turning similarly to the above-described embodiment. On the other hand, when the flight vehicle 100 is in the second mode, the control unit 110 does not interpret the instruction of the velocity and the instruction of the angular velocity received from the controller 200 as the start instruction of the circular turning, and causes the flight vehicle 100 to fly at the velocity and angular velocity on which the instructions are given. The user may perform the operation of designating the mode on the operation unit 230, or may perform the operation using a touch panel in a case where the display unit 220 includes the touch panel.

Figure 7:
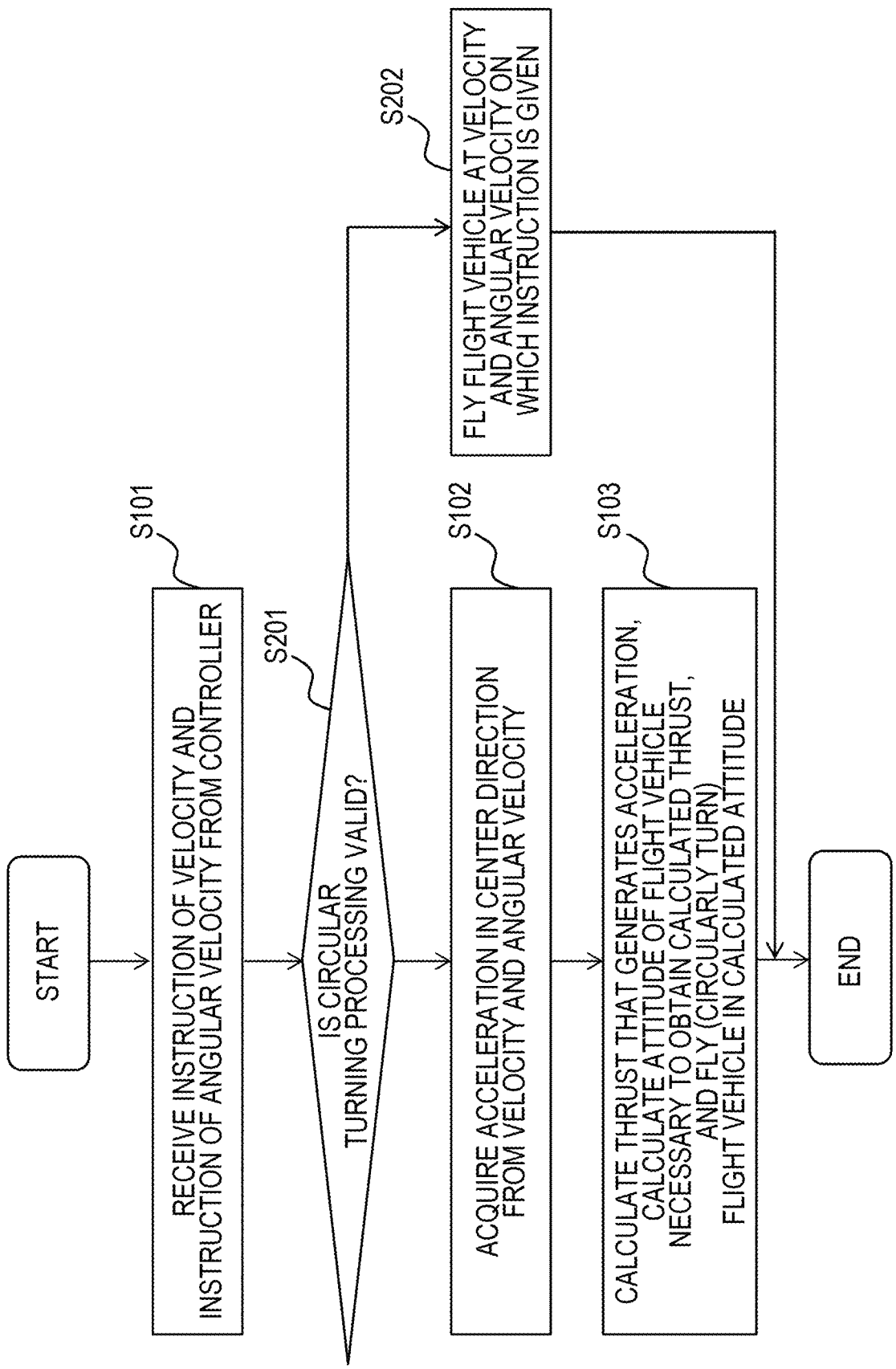
FIG. 7 is a flowchart showing an example of operation of a control unit of the flight vehicle according to a modified example 1.

FIG. 7 is a flowchart showing an example of operation of the control unit 110 of the flight vehicle 100 according to the modified example 1. Steps S201 and S202 are added to the flowchart in FIG. 6. In step S201, the control unit 110 determines whether or not the circular turning processing is valid. In the case where the circular turning processing is valid, steps S102 and S103 are executed similarly to the first embodiment described above. In the case where the circular turning processing is invalid, the control unit 110 causes the flight vehicle 100 to fly at the velocity and acceleration on which an instruction is given (S202).

MODIFIED EXAMPLE 2

In a case where the flight vehicle 100 is made to perform circular turning, the control unit 110 of the flight vehicle 100 may increase the acceleration of the flight vehicle 100 to a target value in accordance with time, with the acquired acceleration (acceleration in the center direction) as the target value. For example, the acceleration is increased to the target value at a first inclination. Furthermore, in a case where the circular turning is stopped, that is, in a case where the acceleration in the center direction is set to zero, the control unit 110 may reduce the acceleration of the flight vehicle 100 according to time with the acceleration of zero as the target value. For example, the acceleration is reduced to zero at a second inclination. The absolute value of the second inclination may be different from or the same as the absolute value of the first inclination.

Figure 8:
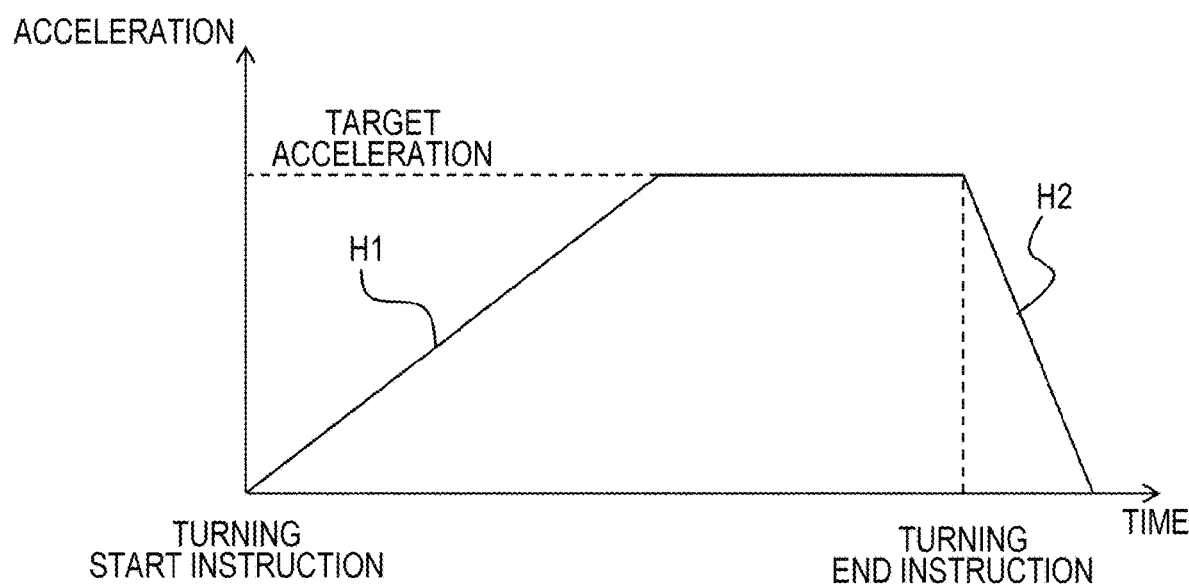
FIG. 8 is a diagram showing an example in which a center direction acceleration is gradually increased or decreased.

FIG. 8 is a diagram showing an example in which the center direction acceleration is gradually increased or decreased. After receiving the turning start instruction data (angular velocity and velocity) from the controller 200, the control unit 110 of the flight vehicle 100 calculates the center direction acceleration based on the angular velocity and the velocity. The control unit 110 increases the center direction acceleration at a first inclination H1 with the center direction acceleration as the target acceleration. The first inclination is equal to or less than a first upper limit value. If the acceleration is increased at a time until the target acceleration is reached, the attitude of the flight vehicle 100 changes too rapidly to cause a possibility of the image quality of a video captured by the camera 160 being degraded. Therefore, by smoothly changing the attitude of the flight vehicle 100 up to the target acceleration, degradation of the image quality can be suppressed. It is desirable that the first upper limit value of the inclination at which the degradation of the image quality can be suppressed is obtained in advance, and the first inclination is set to be equal to or less than the first upper limit value.

Furthermore, after receiving the turning end instruction data from the controller 200, the control unit 110 decreases the center direction acceleration to zero with a second inclination H2. If the absolute value of the inclination of the second inclination H2 is set small (the inclination is made gentle), the flight vehicle 100 takes time to end the turning and cannot be immediately moved in a target direction. Meanwhile, similarly to the case of increasing the center direction acceleration, a rapid change in the attitude of the flight vehicle 100 affects the image quality of the camera 160. Therefore, the absolute value of the second inclination for decreasing the center direction acceleration is made larger than the absolute value of the first inclination for increasing the center direction acceleration. That is, the absolute value of the second inclination for decreasing the center direction acceleration (the absolute value of the amount of change in the acceleration per unit time) is larger than the absolute value of the first inclination for increasing the center direction acceleration (the absolute value of the amount of change in the acceleration per unit time). In addition, the absolute value of the second inclination that decreases the center direction acceleration is set to be equal to or less than a second upper limit value within which the image quality degradation is allowed.

MODIFIED EXAMPLE 3

In a case where the display unit 220 includes a touch panel, the user may input the velocity and the angular velocity for the circular turning instruction using the touch panel. Furthermore, in a case where the control unit 210 of the controller 200 is configured as an information processing terminal, and a display unit of the information processing terminal includes a touch panel, the user may input the velocity and the angular velocity for the circular turning instruction using the touch panel.

MODIFIED EXAMPLE 4

The acceleration in the center direction may be calculated not by the control unit 110 of the flight vehicle 100 but by the control unit 210 of the controller 200. In this case, the control unit 210 of the controller 200 may transmit information on the acceleration in the center direction to the flight vehicle 100, and the control unit 110 of the flight vehicle 100 may control the attitude of the flight vehicle 100 to perform circular turning on the basis of the received acceleration.

Note that the above-described embodiment illustrates examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are similarly included in the invention described in the claims and the equivalent scopes thereof.

Furthermore, the effects of the present disclosure described in the present description are merely exemplification, and other effects may be provided.

Note that the present disclosure can have the following configurations.

Item 1

An information processing method includes
causing a computer to generate, on the basis of first information giving an instruction on a velocity of a moving body and second information giving an instruction on an angular velocity of the moving body, and with a direction of the velocity as a tangential direction, an acceleration in a center direction of a circle having a radius corresponding to the velocity and the angular velocity.

Item 2

The information processing method according to item 1, in which
the acceleration is a value proportional to a product of the velocity and the angular velocity.

Item 3

The information processing method according to item 1 or 2, including
controlling movement of the moving body on the basis of the acceleration.

Item 4

The information processing method according to item 3, including
calculating a thrust of the moving body and an attitude of the moving body necessary for moving the moving body with the acceleration, and controlling the movement of the moving body on the basis of the thrust and the attitude that are calculated.

Item 5

The information processing method according to any one of items 1 to 4, including switching between a first mode in which movement of the moving body is controlled on the basis of the acceleration, and
a second mode in which movement of the moving body is controlled on the basis of the first information and the second information.

Item 6

The information processing method according to any one of items 1 to 5, including
increasing an acceleration to be applied to the moving body according to time using the acceleration as a target acceleration.

Item 7

The information processing method according to item 6, including
decreasing the acceleration to be applied to the moving body according to time in a case where application of the acceleration is stopped.

Item 8

The information processing method according to item 7, in which,
in a case where the application of the acceleration is stopped, the acceleration has an absolute value of an amount of change per unit time, the absolute value being larger than an absolute value of an amount of change of the acceleration in a case where the acceleration is applied.

Item 9

The information processing method according to any one of items 1 to 8, in which
the first information gives an instruction on a velocity of the moving body in a horizontal direction,
the second information gives an instruction on an angular velocity of the moving body in the horizontal direction, and
the acceleration includes acceleration in the horizontal direction of the moving body.

Item 10

The information processing method according to any one of items 1 to 9, including
displaying at least one of an orbit of the circle or a center of the circle on a display device.

Item 11

The information processing method according to any one of items 1 to 10, in which
the moving body includes a flight vehicle.

Item 12

An information processing apparatus includes
a control unit that generates, on the basis of first information giving an instruction on a velocity of a moving body and second information giving an instruction on an angular velocity of the moving body, and with a direction of the velocity as a tangential direction, an acceleration in a center direction of a circle having a radius corresponding to the velocity and the angular velocity.

Item 13

An information processing system includes:
a moving body; and
an operation terminal including an acquisition unit that acquires first information giving an instruction on a velocity of the moving body and second information giving an instruction on an angular velocity of the moving body, and a transmission unit that transmits the first information and the second information,
in which the moving body includes:
a reception unit that receives the first information and the second information; and
a control unit that generates, on the basis of the first information and the second information and with a direction of the velocity as a tangential direction, an acceleration in a center direction of a circle having a radius corresponding to the velocity and the angular velocity, and controls movement of the moving body on the basis of the acceleration.

REFERENCE SIGNS LIST

100 Flight vehicle (Flight device)
101 Information processing apparatus
110 Control unit
120 Sensor unit
130 Position/velocity detection unit
140 Communication unit
150 Storage unit
160 Camera
170 Drive unit
170_1 Drive unit
170_N Drive unit
171 Motor
171_1 Motor
171_N Motor
172 Propeller
172_1 Propeller
172_2 Propeller
172_3 Propeller
172_4 Propeller
172_N Propeller
200 Controller (Remote controller)
210 Control unit
220 Display unit
221 Orbit
222 Center point
223 Information
230 Operation unit
231 Left stick
232 Right stick
240 Communication unit
250 Storage unit

The invention claimed is:
1. An information processing method comprising:
receiving first information giving an instruction on a velocity of a moving body and second information giving an instruction on an angular velocity of the moving body;
setting a direction of the velocity of the moving body as a velocity in a tangential direction of a circle having a radius corresponding to the velocity of the moving body and the angular velocity of the moving body;

acquiring, directly on a basis of the instructed velocity of the moving body and the instructed angular velocity of the moving body, an acceleration in a center direction of the circle having the radius corresponding to the velocity of the moving body and the angular velocity of the moving body, the acquired acceleration being a product of the instructed velocity of the moving body and the instructed angular velocity of the moving body; and controlling movement of the moving body on a basis of the acquired acceleration.

2. The information processing method according to claim 1, further comprising:

calculating a thrust of the moving body and an attitude of the moving body necessary for moving the moving body with the acquired acceleration, and controlling the movement of the moving body on a basis of the thrust of the moving body and the attitude of the moving body that are calculated.

3. The information processing method according to claim 1, further comprising switching between:

a first mode in which the movement of the moving body is controlled on a basis of the acquired acceleration, and a second mode in which the movement of the moving body is controlled on a basis of the first information giving the instruction on the velocity of the moving body and the second information giving the instruction on the angular velocity of the moving body.

4. The information processing method according to claim 3, wherein the acceleration is not acquired in the second mode.

5. The information processing method according to claim 1, further comprising increasing an acceleration to be applied to the moving body according to time using the acquired acceleration as a target acceleration.

6. The information processing method according to claim 5, further comprising decreasing the acceleration to be applied to the moving body according to time in a case where application of the acquired acceleration is stopped.

7. The information processing method according to claim 6, wherein, in the case where the application of the acquired acceleration is stopped, the acceleration has an absolute value of an amount of change per unit time, the absolute value being larger than an absolute value of an amount of change of the acceleration in a case where the acquired acceleration is applied.

8. The information processing method according to claim 1, wherein the first information gives the instruction on the velocity of the moving body in a horizontal direction of the moving body, the second information gives the instruction on the angular velocity of the moving body in the horizontal direction of the moving body, and the acquired acceleration includes the acceleration in the horizontal direction of the moving body.

9. The information processing method according to claim 1, further comprising displaying at least one of an orbit of the circle or a center of the circle on a display device.

10. The information processing method according to claim 1, wherein the moving body includes a flight vehicle.

11. The information processing method according to claim 1, further comprising setting the center direction as a direction rotated by 90 degrees in a rotation direction from the tangential direction.

12. The information processing method according to claim 1, wherein acquiring the acceleration directly includes acquiring the acceleration from a look-up table in which the velocity of the moving body and the angular velocity of the moving body are associated with the acceleration.

13. The information processing method according to claim 1, wherein acquiring the acceleration includes acquiring the acceleration as an acceleration necessary for moving the moving body in the center direction.

14. The information processing method according to claim 1, wherein acquiring the acceleration includes acquiring the acceleration only from the velocity of the moving body and the angular velocity of the moving body.

15. The information processing method according to claim 1, wherein acquiring the acceleration directly includes inputting the velocity of the moving body and the angular velocity of the moving body into a function having the velocity and the angular velocity as input variables and the acceleration as an output variable.

16. The information processing method according to claim 1, wherein acquiring the acceleration directly includes calculating the product of the instructed velocity of the moving body and the instructed angular velocity of the moving body.

17. An information processing apparatus comprising processing circuitry configured to:

receive first information giving an instruction on a velocity of a moving body and second information giving an instruction on an angular velocity of the moving body;

set a direction of the velocity of the moving body as a velocity in a tangential direction of a circle having a radius corresponding to the velocity of the moving body and the angular velocity of the moving body;

acquire, directly on a basis of the instructed velocity of the moving body and the instructed angular velocity of the moving body, an acceleration in a center direction of the circle having the radius corresponding to the velocity of the moving body and the angular velocity of the moving body, the acquired acceleration being a product of the instructed velocity of the moving body and the instructed angular velocity of the moving body; and control movement of the moving body on a basis of the acquired acceleration.

18. An information processing system comprising:

a moving body; and an operation terminal including processing circuitry configured to:

acquire first information giving an instruction on a velocity of the moving body and second information giving an instruction on an angular velocity of the moving body; and transmit the first information and the second information, wherein the moving body includes processing circuitry configured to:

receive the first information giving the instruction on the velocity of the moving body and the second information giving the instruction on the angular velocity of the moving body;

set a direction of the velocity of the moving body as a velocity in a tangential direction of a circle having a radius corresponding to the velocity of the moving body and the angular velocity of the moving body;

acquire, directly on a basis of the instructed velocity of the moving body and the instructed angular velocity of the moving body, an acceleration in a center direction of the circle having the radius corresponding to the velocity of the moving body and the angular velocity of the moving body, the acquired acceleration being a product of the instructed velocity of the moving body and the instructed angular velocity of the moving body; and control movement of the moving body on a basis of the acquired acceleration.

* * * * *